(12) United States Patent
Chen et al.

(10) Patent No.: US 12,022,146 B2
(45) Date of Patent: Jun. 25, 2024

(54) USER INTERFACE DISPLAY METHOD AND DEVICE

(71) Applicant: VIDAA (NETHERLANDS) INTERNATIONAL HOLDINGS B.V., Duiven (NL)

(72) Inventors: Wenzhu Chen, Shandong (CN); Yakai Lu, Shandong (CN); Chen Sun, Shandong (CN)

(73) Assignee: VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 241 days.

(21) Appl. No.: 17/455,266

(22) Filed: Nov. 17, 2021

(65) Prior Publication Data
US 2022/0078505 A1 Mar. 10, 2022

Related U.S. Application Data

(63) Continuation of application No. PCT/CN2020/079178, filed on Mar. 13, 2020.

(30) Foreign Application Priority Data

Dec. 19, 2019 (CN) .......................... 201911317727.1

(51) Int. Cl.
*H04N 21/422* (2011.01)
*H04N 21/431* (2011.01)
*H04N 21/485* (2011.01)

(52) U.S. Cl.
CPC ... *H04N 21/42204* (2013.01); *H04N 21/4312* (2013.01); *H04N 21/4858* (2013.01)

(58) Field of Classification Search
CPC ......... H04N 21/42204; H04N 21/4312; H04N 21/4858; G06F 3/048
USPC .......................................................... 725/39
See application file for complete search history.

(56) References Cited

U.S. PATENT DOCUMENTS

| 9,942,615 B1 * | 4/2018 | Panchaksharaiah .... G06F 16/48 |
| 11,449,185 B1 * | 9/2022 | Hendrickson ............ G09G 5/14 |
| 2012/0102385 A1 * | 4/2012 | Prebble ................. G06F 40/103 715/227 |

(Continued)

FOREIGN PATENT DOCUMENTS

| CN | 102662493 A | 9/2012 |
| CN | 105095200 A | 11/2015 |

(Continued)

OTHER PUBLICATIONS

Wang, Da-Yong, Method and Display Device That Presents a User Interface, Apr. 2019, CN 109618206 (Year: 2019).*

(Continued)

*Primary Examiner* — Nathan J Flynn
*Assistant Examiner* — Caroline Somera
(74) *Attorney, Agent, or Firm* — Workman Nydegger (57) ABSTRACT

The present application provides a display device, comprising: a display; a user interface; and a controller, configured to: control the display to display a user interface in response to user input for indicating displaying a plurality of items, the user interface comprising a plurality of items, the plurality of items being arranged in an equal-width and unequal-height mode, and the user interface further comprising a selector for indicating that a item is selected.

18 Claims, 6 Drawing Sheets

(56) References Cited

U.S. PATENT DOCUMENTS

| | | | | |
|---|---|---|---|---|
| 2012/0204211 | A1* | 8/2012 | Makino | H04N 21/2353 |
| | | | | 725/44 |
| 2013/0238994 | A1* | 9/2013 | Yurasits | G06F 3/0482 |
| | | | | 715/716 |
| 2013/0318554 | A1* | 11/2013 | Minehara | H04N 21/4314 |
| | | | | 725/39 |
| 2016/0192019 | A1* | 6/2016 | Tanaka | H04N 21/4532 |
| | | | | 725/46 |
| 2018/0367840 | A1* | 12/2018 | Kleinerman | H04N 21/4821 |
| 2019/0377465 | A1 | 12/2019 | Singal et al. | |
| 2020/0004393 | A1* | 1/2020 | Robertson | G06F 3/0482 |
| 2020/0153676 | A1* | 5/2020 | Bradbury | H04N 21/4532 |
| 2020/0272666 | A1* | 8/2020 | Van Os | G06F 3/04842 |
| 2023/0120912 | A1* | 4/2023 | Simon | G06F 3/04842 |
| | | | | 715/768 |

FOREIGN PATENT DOCUMENTS

| | | |
|---|---|---|
| CN | 105871945 A | 8/2016 |
| CN | 106341717 A | 1/2017 |
| CN | 109743605 A | 5/2019 |
| CN | 109933323 A | 6/2019 |
| CN | 110058909 A | 7/2019 |
| CN | 110187781 A | 8/2019 |

OTHER PUBLICATIONS

International Search Report, from PCT/CN2020/079178 filed Mar. 13, 2020, mailed Sep. 22, 2020.
Chinese Office Action, from CN201911317727 filed Dec. 19, 2019, mailed Sep. 1, 2020.

* cited by examiner

USER INTERFACE DISPLAY METHOD AND DEVICE

CROSS-REFERENCE TO RELATED APPLICATIONS

This application is a continuation application of International Applied No. PCT/CN2020/079178 filed on Mar. 13, 2020, which claims the priority of the Chinese patent application No. 201911317727.1 filed on Dec. 19, 2019, both of which are incorporated herein by reference.

FIELD

The disclosure relates to the technical field of display, in particular to a display apparatus.

BACKGROUND

In an operating system (Android, Linux, etc.) on a smart television, resources such as videos, applications and pictures are used more. Usually, items relevant to the resources will be shown, so that a user knows and selects the corresponding resources and performs further playing or operations and the like.

A current display apparatus lacks a good page layout to show the items.

SUMMARY

A first aspect of the disclosure provides a display apparatus, including: a display; a user input interface, configured to receive a user input; and a controller, configured to: control the display to present a user interface in response to a first user input for indicating displaying of a plurality of items, wherein the user interface includes the plurality of items, and the plurality of items are configured with equal widths and unequal heights; and the user interface includes a selector for indicating that the item is selected, and the selector is configured to select the different items by being moved in the user interface.

In some embodiments, the controller is further configured to: control the selector to move from a current item to a target item in response to a second user input for indicating moving the selector, wherein regions of the target item and the current item have a maximum consistence along a height direction of a column.

In some embodiments, the quantity of the columns is determined by a page width actually displayed by the display.

In some embodiments, the controller is further configured to: in response to a third user input for indicating activation of a selected item, activate the selected item.

In some embodiments, the controller is further configured to: cause a first item in a region outside the user interface and not yet displayed in the user interface to be presented in an updated user interface and cause the selector to move onto the first item in the updated user interface in response to the selector moving from the user interface currently presented on the display to the region outside the user interface.

In some embodiments, the controller is further configured to: determine, based on a fourth user input, that the selector is currently located on an item at a boundary location in the user interface, wherein the fourth user input indicates that the selector will move to select an item outside a boundary of the user interface displayed by the display.

A second aspect of the disclosure provides a display apparatus, including: a display; a user input interface, configured to receive a user input; and a controller, configured to: in response to a user input for displaying a type of items, determine a height of each column of items in a preset quantity of columns, lay out at least one target item to a column with a minimum height in each column of items, and control the display to display a user interface including the type of items, wherein the type of items includes a plurality of items, and the plurality of items include the at least one target item.

In some embodiments, the plurality of items in the user interface are arranged in columns and not arranged in rows, wherein a quantity of the columns is determined by a page width actually displayed by the display.

In some embodiments, the items in the different columns in the user interface cross in a height direction of the items.

A third aspect of the disclosure provides a display apparatus, including: a display; a user input interface, configured to receive a user input; and a controller, configured to: in response to a first user input for displaying a type of items, sort a preset quantity of columns according to a height of each column of items from low to high, sort a preset quantity of target items according to heights of the target items from high to low, sequentially arrange the sorted preset quantity of target items to the sorted columns based on results of the two times of sorting, and control the display to display a user interface including the type of items, wherein the type of items includes a plurality of items, and the plurality of items include at least one of the target items.

In some embodiments, the items displayed in the user interface are obtained by scaling the obtained target items.

DETAILED DESCRIPTION OF THE EMBODIMENTS

In order to make the objectives, schemes and advantages of the disclosure more clear, the disclosure will be further described in detail below with reference to the drawings. Obviously, the described embodiments are only part of the embodiments of the disclosure, but not all the embodiments. On the basis of the embodiments in the disclosure, all other embodiments obtained by a person of ordinary skill in the art without inventive efforts fall within the protection scope of the disclosure.

The term "user interface" in the disclosure refers to a medium interface for interaction and information exchange between an application or an operating system and a user, and realizes conversion between an internal form and a user acceptable form of information. A common form of the user interface is a graphic user interface (GUI), referring to a user interface relevant to computer operations and displayed in a graphic mode. The user interface may comprise interface elements such as an icon, a window and a control displayed on a screen of a display apparatus, wherein the control may include visual interface elements such as an icon, a button, a menu, a tab, a text box, a dialog box, a status bar, a navigation bar, and a Widget.

Figure 1A:
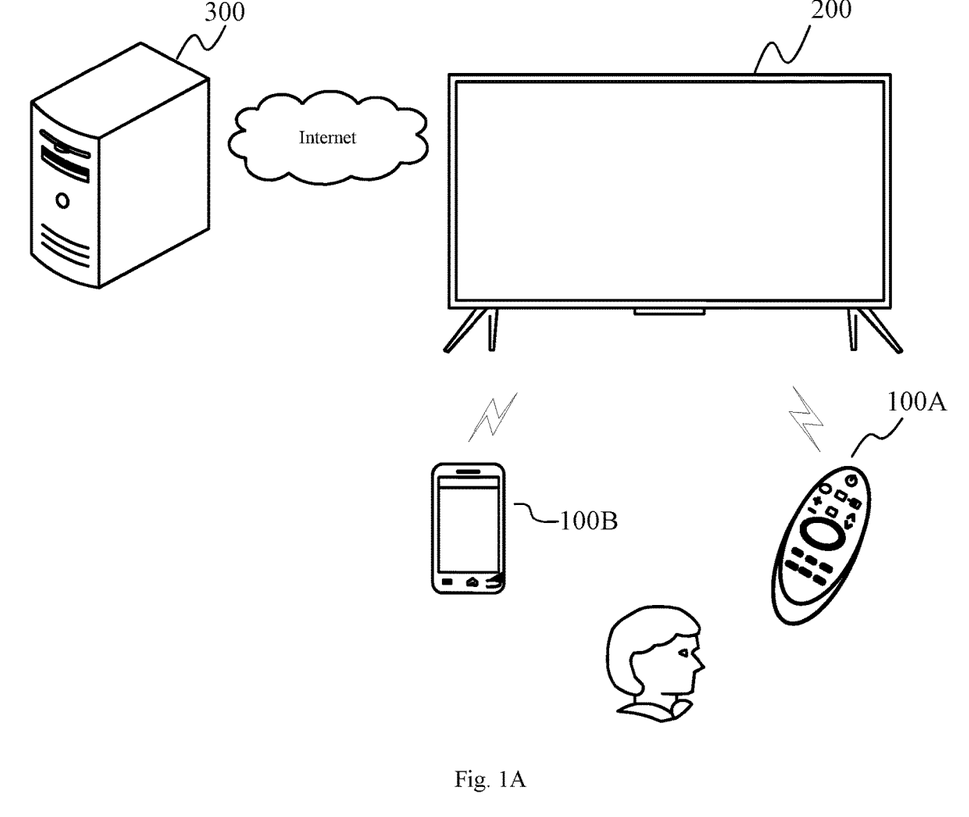
FIG. 1A illustrates a schematic diagram of an operating scene between a display apparatus and a control device.

FIG. 1A illustrates a schematic diagram of an operating scenario between a display apparatus and a control device. As shown in FIG. 1A, the control device 100 and the display apparatus 200 may be in communication in a wired or wireless mode.

The control device 100 is configured to control the display apparatus 200, may receive a command from a user and convert the command into an instruction which can be recognized and responded by the display apparatus 200, and plays an interaction intermediary role between the user and the display apparatus 200. For example, the user operates a channel up/down key in the control device 100, and the display apparatus 200 responds to the channel up/down operation.

The control device 100 may be a remote control 100A, including infrared protocol communication or Bluetooth protocol communication and other short-distance communication modes, and controlling the display apparatus 200 in wireless or other wired modes. The user may input a user command through keys, voice input, control panel input and the like on the remote control to control the display apparatus 200. For example, the user may input corresponding commands through a volume up/down key, a channel control key, an up/down/left/right direction key, a voice input key, a menu key, a power key and the like on the remote control, so as to realize the function of controlling the display apparatus 200.

The control device 100 may also be an intelligent device, such as a mobile terminal 100B, a tablet computer, a computer and a notebook computer. For example, an application running on the intelligent device is used to control the display apparatus 200. Through configuration, the application may provide various control for the user on a screen associated with the intelligent device through an intuitive user interface (UI).

Exemplarily, software applications may be installed on both the mobile terminal 100B and the display apparatus 200, so as to realize connection and communication through a network communication protocol, and further achieve the purposes of one-to-one control operations and data communication. For example, a control instruction protocol may be established between the mobile terminal 100B and the display apparatus 200 to achieve functions of physical keys, for example, arranged on the remote control 100A by operating various functional keys or virtual buttons of the user interface provided on the mobile terminal 100B; and audio and video contents displayed on the mobile terminal 100B may also be transmitted onto the display apparatus 200 so as to realize a synchronous display function.

The display apparatus 200 may provide a network television function with a broadcast reception function and a computer support function. The display apparatus may be implemented as a digital television, a network television, an Internet protocol television (IPTV) and the like.

The display apparatus 200 may be a liquid crystal display, an organic light emitting display, and a projection device. Types, sizes, resolutions, and the like of specific display apparatuses are not limited.

The display apparatus 200 may further perform data communication with a server 300 in multiple communication modes. Here, the display apparatus 200 may be allowed to perform communication connection through a local area network (LAN), a wireless local area network (WLAN) or the other networks. The server 300 may provide various contents and interactions for the display apparatus 200. Exemplarily, the display apparatus 200 may send and receive information, for example, receives electronic program guide (EPG) data, receives software program update or accesses a remotely-stored digital media library. The server 300 may be one or more groups, and may be one or more kinds of servers. Other network service contents such as video on demand and advertising service are provided through the server 300.

Figure 1B:
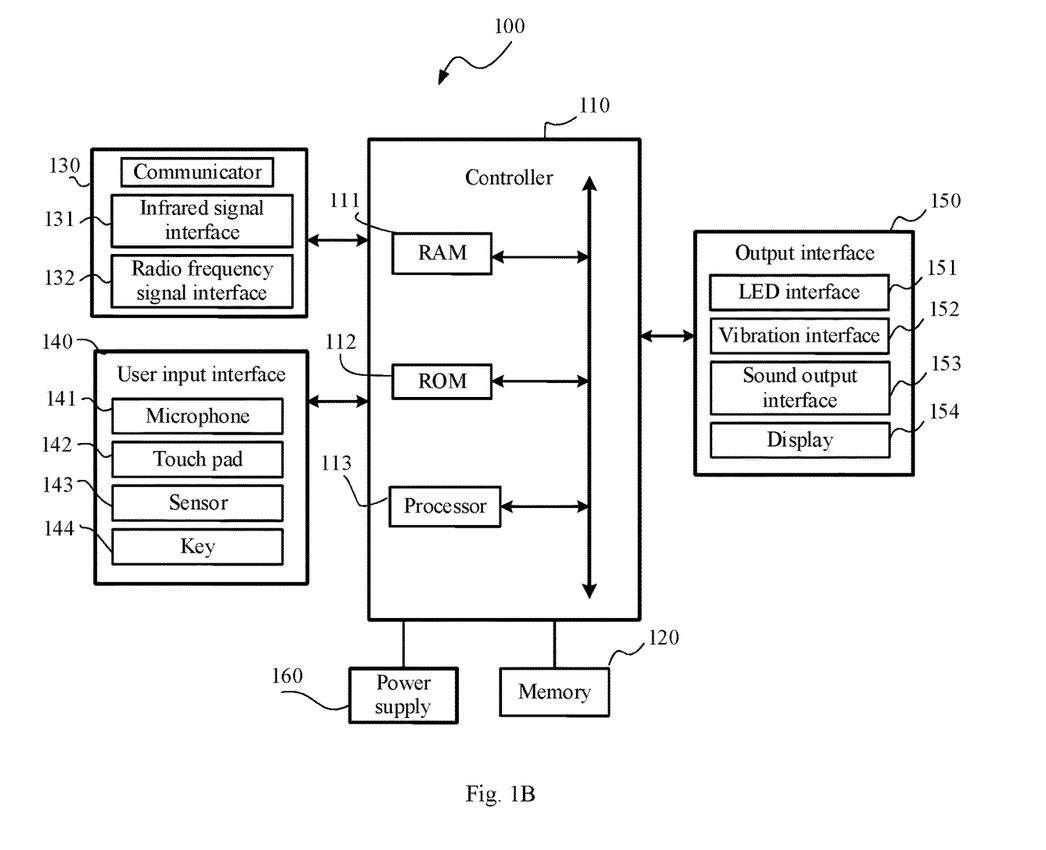
FIG. 1B illustrates a configuration block diagram of a control device 100 in FIG. 1A.

FIG. 1B illustrates a configuration block diagram of the control device 100. As shown in FIG. 1B, the control device 100 includes a controller 110, a memory 120, a communicator 130, a user input interface 140, an output interface 150, and a power supply 160.

The controller 110 includes a random access memory (RAM) 111, a read-only memory (ROM) 112, a processor 113, a communication interface and a communication bus. The controller 110 is configured to control running and operations of the control device 100, communication cooperation between all internal units, and external and internal data processing functions.

Exemplarily, when an interaction that the user presses the keys arranged on the remote control 100A or touches a touch panel arranged on the remote control 100A is detected, the controller 100 may control to generate a signal corresponding to the detected interaction, and sends the signal to the display apparatus 200.

The memory 120 is configured to store various running programs, data and applications for driving and controlling the control device 100 under control of the controller 110. The memory 120 may store various control signal instructions input from the user.

Under control of the controller 110, the communicator 130 realizes communication of a control signal and a data signal with the display apparatus 200. For example, the control device 100 sends a control signal (such as a touch signal or a button signal) to the display apparatus 200 through the communicator 130, and the control device 100 may receive, through the communicator 130, the signal sent from the display apparatus 200. The communicator 130 may include an infrared signal interface 131 and a radio frequency signal interface 132. For example, when the infrared signal interface is adopted, the user input instruction needs to be converted into an infrared control signal according to an infrared control protocol, so as to send to the display apparatus 200 through an infrared sending module. For another example, when the radio frequency signal interface is adopted, the user input instruction needs to be converted into a digital signal, and then the digital signal is modulated according to a radio frequency control signal modulation protocol and then sent to the display apparatus 200 through a radio frequency sending terminal.

The user input interface 140 may include at least one of a microphone 141, a touch panel 142, a sensor 143, or a key 144 so that the user may input the user instruction associated with controlling the display apparatus 200 to the control device 100 through voice, touch, a gesture, pressing and the like.

The output interface 150 outputs the user instruction received from the user input interface 140 to the display apparatus 200, or outputs an image or voice signal received from the display apparatus 200. Here, the output interface 150 may include an LED interface 151, a vibration interface 152 for generating vibration, a sound output interface 153 for outputting sound, a display 154 for outputting an image, and the like. For example, the remote control 100A may receive output signals such as audios, videos or data from the output interface 150, displays the output signals on the display 154 in an image form, outputs the output signals on the sound output interface 153 in an audio form, or outputs the output signals on the vibration interface 152 in a vibration form.

The power supply 160 is configured to provide power support for all elements of the control device 100 under control of the controller 110. The power supply may be in the form of a battery and a relevant control circuit.

Figure 1C:
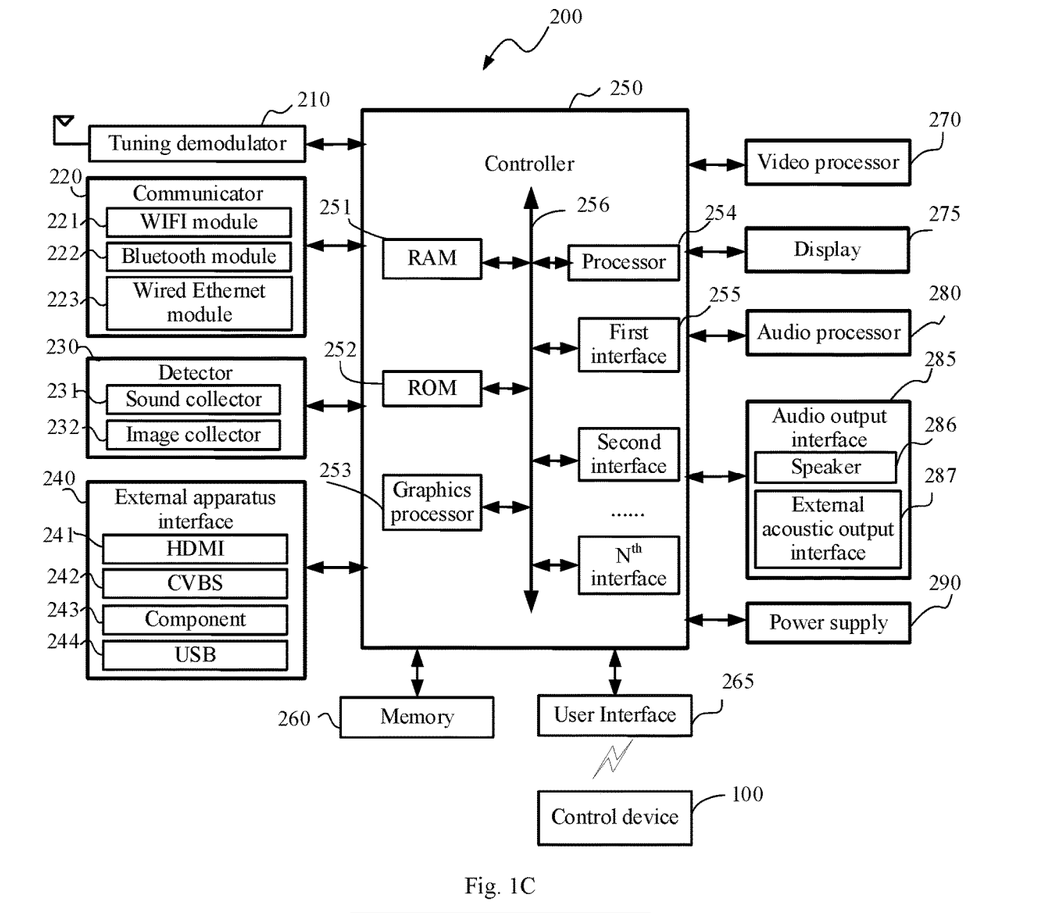
FIG. 1C illustrates a configuration block diagram of a display apparatus 200 in FIG. 1A.

FIG. 1C illustrates a block diagram of hardware configuration of the display apparatus 200. As shown in FIG. 1C, the display apparatus 200 may include a tuning demodulator 210, a communicator 220, a detector 230, an external apparatus interface 240, a controller 250, a memory 260, a user input interface 265, a video processor 270, a display 275, an audio processor 280, an audio output interface 285, and a power supply 290.

The tuning demodulator 210 receives broadcast television signals in a wired or wireless mode, may perform modulation-demodulation processing such as amplification, frequency mixing and resonance, and is configured to demodulate an audio and video signal carried in a frequency of a television channel selected by the user and additional information (for example, an EPG data) from the plurality of wireless or cable broadcast television signals.

The tuning demodulator 210 may respond to the frequency of the television channel selected by the user and the television signal carried by the frequency under control of the controller 250 according to user selection.

According to different broadcast systems of the television signals, the tuning demodulator 210 may have multiple signal receiving manners, for example: terrestrial broadcasting, cable broadcasting, satellite broadcasting or Internet broadcasting; according to different modulation types, the tuning demodulator may adopt a digital modulation mode or an analog modulation mode; and according to the different types of received television signals, an analog signal and a digital signal may be demodulated.

In some other embodiments, the tuning demodulator 210 may also be in an external device, such as an external set top box. In this way, the set top box outputs the television signals after modulation and demodulation to input the signals into the display apparatus 200 through the external apparatus interface 240.

The communicator 220 is a component configured to communicate with an external device or an external server according to various communication protocol types. For example, the display apparatus 200 may send content data to the external device connected via the communicator 220, or browse and download the content data from the external device connected via the communicator 220. The communicator 220 may include a WIFI module 221, a Bluetooth communication protocol module 222, a wired Ethernet communication protocol module 223, and other network communication protocol modules or near field communication protocol modules, so that the communicator 220 may receive the control signal from the control device 100 according to control of the controller 250, and process the control signal as a WIFI signal, a Bluetooth signal, a radio frequency signal and the like.

The detector 230 is a component for the display apparatus 200 to collect a signal of an external environment or a signal interacting with the outside. The detector 230 may include a sound collector 231, such as a microphone, which may be configured to receive sound of the user, for example, a voice signal of a control instruction from the user to control the display apparatus 200; or may collect environmental sound for recognizing environmental scene types, so that the display apparatus 200 may be self-adaptive to environmental noise.

In some other embodiments, the detector 230 may further include an image collector 232, such as a camera and a webcam, which may be configured to collect an external environment scene so as to change display parameters of the display apparatus 200 accordingly; and configured to collect attributes of the user or interact gestures with the user, so as to realize an interactive function between the display apparatus and the user.

In some other embodiments, the detector 230 may further include an optical receiver, configured to collect environment light so as to change the display parameter of the display apparatus 200 accordingly.

In some other embodiments, the detector 230 may further include a temperature sensor, for example, the display apparatus may adjust a display color temperature of an image by sensing an environment temperature. Exemplarily, when the environment temperature is high, the color temperature of the image displayed by the display apparatus 200 may be adjusted to a relatively cold tune; and when the environment temperature is low, the color temperature of the image displayed by the display apparatus 200 may be adjusted to a relatively warm tune.

The external apparatus interface 240 is a component for providing the controller 250 with controlling over data transmission between the display apparatus 200 and an external device. The external apparatus interface 240 may be connected with external devices such as a set top box, a game apparatus and a notebook computer in a wired/wireless mode, and may receive data such as a video signal (such as a dynamic image), an audio signal (such as music), additional information (such as EPGs) from the external devices.

The external apparatus interface 240 may include: any one or more of a high definition multimedia interface (HDMI) 241, a composite video blanking synchronization (CVBS) interface 242, an analog or digital component interface 243, a universal serial bus (USB) interface 244, a component interface (not shown in the figure), or a red green blue (RGB) interface (not shown in the figure).

The controller 250 controls working of the display apparatus 200 and responds to operations of the user by running various software control programs (such as an operating system and various applications) stored on the memory 260.

As shown in FIG. 1C, the controller 250 includes a random access memory (RAM) 251, a read only memory (ROM) 252, a graphics processor 253, a CPU 254, a communication interface 255, and a communication bus 256. The RAM 251, ROM 252, the graphics processor 253, the CPU 254 and the communication interface 255 are connected through the communication bus 256.

The ROM 252 is configured to store various system start-up instructions. For example, when a power-on signal is received, a power source of the display apparatus 200 begins to start, the CPU 254 runs the system start-up instruction in the ROM 252 to copy an operating system stored in the memory 260 into the RAM 251 so as to begin to run to start the operating system. After the operating system is started, the CPU 254 copies the various applications in the memory 260 into the RAM 251 again, and then, begins to run to start the various applications.

The graphics processor 253 is configured to generate various graphic objects, such as an icon, an operating menu, and user input instruction display graphics. The graphics processor 253 may include an arithmetic unit, configured to perform computation by receiving various interactive instructions input from the user and then display various objects according to a display attribute; and include a renderer, configured to generate the various objects obtained based on the arithmetic unit and display a rendered result on the display 275.

The CPU 254 is configured to execute the operating system and the application instructions stored in the memory 260 and execute processing of the various applications, data and contents according to the received user input instruction, so as to finally display and play the various audio and video contents.

In some exemplary embodiments, the CPU 254 may include a plurality of processors. The plurality of processors may include one main processor and one or more sub processors. The main processor is configured to execute some initialization operations of the display apparatus 200 in a preloading mode of the display apparatus, and/or the operation of displaying pictures under a normal mode. The one or more sub processors are configured to execute an operation in a standby mode and the like of the display apparatus.

The communication interface 255 may include a first interface to an n$^{th}$ interface. These interfaces may be network interfaces connected to an external device via a network.

The controller 250 may control the overall operation of the display apparatus 200. For example, in response to receiving a user input command for selecting a GUI object displayed on the display 275, the controller 250 may execute the operation relevant to the object selected by the user input command.

The object may be any one of optional objects, such as a hyperlink or an icon. The operation relevant to the selected object may be, for example, an operation of displaying connection to a hyperlink page, a document, an image and the like, or an operation of executing an application corresponding to the object. The user input command for selecting the GUI object may be a command input through various input apparatus (such as a mouse, a keyboard, a touch pad and the like) connected to the display apparatus 200, or a voice command corresponding to a voice spoken by the user.

The memory 260 is configured to store various types of data, software programs or applications for driving and controlling the display apparatus 200 to run. The memory 260 may include a volatile and/or nonvolatile memory. The term "memory" includes the memory 260, the RAM 251 and ROM 252 of the controller 250, or a memory card in the display apparatus 200.

In some embodiments, the memory 260 is specifically configured to store programs for driving the controller 250 in the display apparatus 200; store various applications which are built in and downloaded by the user from an external device of the display apparatus 200; and store data for configuring the various GUIs provided by the display 275, the various objects relevant to the GUIs, and visual effect images of the selector configured to select the GUI objects.

In some embodiments, the memory 260 is specifically configured to store driving programs and relevant data of the tuning demodulator 210, the communicator 220, the detector 230, the external apparatus interface 240, the video processor 270, the display 275, the audio processor 280 and the like, for example, external data (such as audio and video data) received from the external apparatus interface, or user data (such as key information, voice information, and touch information) received from a user interface.

In some embodiments, the memory 260 specifically stores software and/or programs configured to represent the operating system (OS). These software and/or programs may include, for example: a kernel, middleware, an application programming interface (API) and/or applications. Exemplarily, the kernel may control or manage system resources, and functions implemented by other programs (such as the middleware, the API or the application); and meanwhile, the kernel may provide an interface so as to allow the middleware, the API or the applications to access the controller to control or manage the system resources.

Figure 1D:
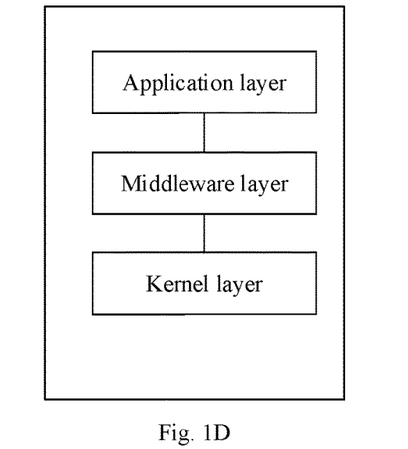
FIG. 1D illustrates a block diagram of architecture configuration of an operating system in a memory of a display apparatus 200.

FIG. 1D illustrates a block diagram of architecture configuration of the operating system in the memory of the display apparatus 200. The architecture of the operating system comprises an application layer, a middleware layer and a kernel layer from top to bottom in sequence.

Built-in applications and non-system-level applications belong to the application layer. The application layer is responsible for direct interaction with a user. The application layer may include a plurality of applications, such as a setting application, an electronic card application, and a media center application. These applications may be implemented as Web applications which are executed based on a WebKit engine, and specifically may be developed and executed on the basis of HTML5, a cascading style sheet (CSS), and JavaScript.

Here, HTML, HyperText markup language, is a standard markup language for creating a web page, which describes the page through a markup label. An HTML label is configured to express characters, graphics, animations, sound, tables, links and the like, a browser will read HTML documents, interpret the contents of the labels in the documents, and display them in a webpage form.

CSS, Cascading Style Sheet, is a computer language configured to represent an HTML document style, and is a language configured to define a style structure, such as a font, a color, and a position. A CSS style may be directly stored in an HTML web page or an independent style document to control styles in the web page.

JavaScript is a language applied to Web page programming, and may be inserted into the HTML page and interpreted and executed by a browser, wherein interaction logics of the Web application are implemented through JavaScript. JavaScript may realize communication with the kernel layer by encapsulating a JavaScript extention interface through the browser.

The middleware layer may provide some standard interfaces so as to support operations of various environments and systems. For example, the middleware layer may be implemented as a multimedia and hypermedia information coding expert group (MHEG) of the middleware related to data broadcasting, may further be implemented as DLNA middleware of the middleware related to external device communication, and may further be implemented as middleware providing browser environments running by all the applications in the display apparatus.

The kernel layer provides core system services, for example: file management, memory management, process management, network management and system security permission management. The kernel layer may be implemented as a kernel based on various operating systems, for example, a kernel based on a Linux operating system.

The kernel layer also provides communication between system software and hardware at the same time, and provides device driving services for various hardware, for example: provides a display driver for the display, provides a webcam driver for the webcam, provides a key driver for the remote control, provides a WiFi driver for a WIFI module, provides an audio driver for an audio output interface, provides power management driver for a power management (PM) module.

The user input interface 265 receives various user interactions. Specifically, the user input interface is configured to send an input signal from the user to the controller 250, or transmits an output signal from the controller 250 to the user. Exemplarily, the remote control 100A may send the input signals, such as a power on signal, a channel selection signal, and a volume adjusting signal, input from the user to the user input interface 265, and then the input signals are forwarded to the controller 250 by the user input interface 265; or the remote control 100A may receive the output signals such as audios, videos or data, output from the user input interface 265 and processed by the controller 250, display the received output signals, or output the received output signals in an audio or vibration form.

In some embodiments, the user may input a user command on the graphical user interface (GUI) displayed on the display 275, and then the user input interface 265 receives the user input command through the GUI. To be specific, the user input interface 265 may receive the user input command configured to control the position of the selector in the GUI so as to select the different objects or items.

Or, the user may input the user command by inputting specific sound or gesture, and then the user input interface 265 recognizes the sound or the gesture through the sensor so as to receive the user input command. The video processor 270 is configured to receive an external video signal, and perform video data processing such as decompression, decoding, scaling, noise reduction, frame rate conversion, resolution conversion and image synthesis according to a standard encoding and decoding protocol of the input signal so as to obtain the video signal directly displayed or played on the display 275.

Exemplarily, the video processor 270 includes a demultiplexing module, a video decoding module, an image synthesis module, a frame rate conversion module, a display formatting module, and the like.

The demultiplexing module is configured to perform demultiplexing processing on an input audio and video data stream. For example, if an MPEG-2 stream (based on a compression standard of digital storage media motion images and voice) is input, the demultiplexing module demultiplexes it into a video signal, an audio signal and the like.

The video decoding module is configured to process the demultiplexed video signal, including decoding, scaling processing and the like.

The image synthesis module, such as an image synthesizer, is configured to perform overlay processing on the GUI signal generated by a graphic generator according to the user input or itself and a video image subjected to scaling processing so as to generate an image signal for display.

The frame rate conversion module is configured to convert a frame rate of the input video, for example, converting the frame rate of an input 60 Hz video into the frame rate of 120 Hz or 240 Hz, and the usual format is implemented in a frame inserting mode.

The display formatting module is configured to change the signal output from the frame rate conversion module into a signal conforming to a display format of the display, for example, performing format conversion on the signal output from the frame rate conversion module so as to output an RGB data signal.

The display 275 is configured to receive the image signal input from the video processor 270 and display a video content, an image and a menu manipulating interface. The displayed video content may come from the video content in the broadcast signal received by the tuning demodulator 210, or the video content input by the communicator 220 or the external apparatus interface 240. The display 275 simultaneously displays the user interface UI generated in the display apparatus 200 and configured to control the display apparatus 200.

The display 275 may include a display screen component configured to present a picture and a driving component for driving image display. Or, if the display 275 is a projection display, it may further include a projection apparatus and a projection screen.

The audio processor 280 is configured to receive an external audio signal and perform audio data processing such as decompression, decoding, noise reduction, digital-to-analog conversion and amplifying processing according to a standard encoding and decoding protocol of the input signal so as to obtain an audio signal for being played in a speaker 286.

Exemplarily, the audio processor 280 may support various audio formats, for example, MPEG-2, MPEG-4, advanced audio coding (AAC) and high-efficiency AAC (HE-AAC).

The audio output interface 285 is configured to receive the audio signal output by the audio processor 280 under control of the controller 250. The audio output interface 285 may include the speaker 286, or an external acoustic output interface 287 for outputting to a sound device of an external apparatus, such as an earphone output interface.

In some other embodiments, the video processor 270 may include one or more chips. The audio processor 280 may also include one or more chips.

In some other embodiments, the video processor 270 and the audio processor 280 may be a separate chip, or be integrated in one or more chips together with the controller 250.

The power supply 290 is configured to provide electric power input by an external power source for the display apparatus 200 as power supply support under control of the controller 250. The power supply 290 may be a built-in power supply circuit installed in the display apparatus 200, or a power source installed outside the display apparatus 200.

Figure 2:
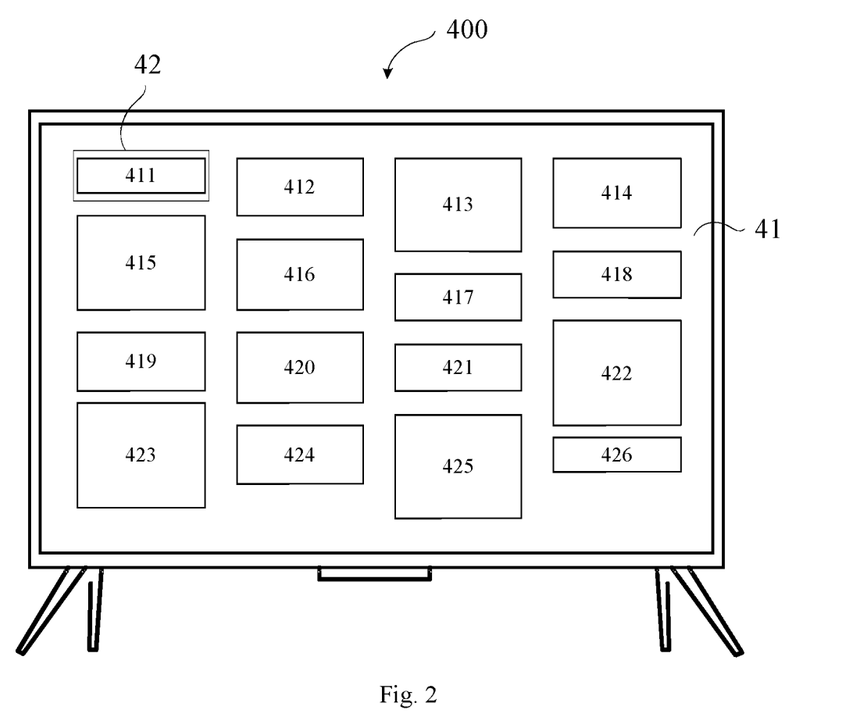
FIG. 2 illustrates a schematic diagram of a GUI 400 in a display apparatus 200.

FIG. 2 illustrates a schematic diagram of the user interface GUI 400 in the display apparatus 200.

In the GUI as shown in FIG. 2, the display apparatus may provide the GUI 400 to the display, and the GUI 400 includes a first GUI 41 (a view display region) comprising a plurality of different items, and a selector for indicating that any item in the GUI 400 is selected. For example, the GUI shown in FIG. 2 includes the first GUI 41 comprising the items 411-426, and the selector 42 for indicating that the item 411 is selected.

It should be noted that the items refer to visual objects displayed in the GUI of the display apparatus 200 so as to show corresponding contents such as icons, thumbnails, and links. For example, when the item is a movie or a teleplay, the item may be displayed as a poster of the movie or the teleplay. When the item is music, a poster of a music album may be displayed. When the item is an application, an icon of the application or content screenshot of the application captured when the application is executed recently may be displayed. When the item is user access history, content screenshot of a recent execution process may be displayed.

Display forms of the items are usually diversified. For example, the items may include text contents and/or images configured to display thumbnails related to the text contents. For another example, the items may be texts and/or icons of applications.

It should further be noted that the position of the selector in the GUI may be moved by operating the control device by the user, so as to select different items. For example, for a focus object, the item may be selected or controlled by controlling the display apparatus to display movement of the focus object according to the user input through the control device. Fox example, the user may select and control the item by controlling the focus object move between the items through a direction key on the control device.

Identification forms of the selector are usually diversified. For example, in FIG. 2, a position of the focus object is implemented or identified by amplifying a border of the item 411. For another example, the position of the focus object may further be implemented or identified by drawing a bold line at the edge of the item. In addition, the position of the focus object may also be identified by changing a border line, a size, a color, transparency and a contour and/or a typeface of the text or the image of a focus item.

In the GUI as shown in FIG. 2, the display provides the items 411-426. For example, the items 411-426 respectively correspond to icons and names of a setting, music, a television assistant, a video, and a file application. For another example, the items 411-426 respectively correspond to thumbnails and names of some pictures. These items may be activated based on the user input to display detailed information of a content corresponding to it. For example, a television assistant application corresponding to the item 413 may be activated on the basis that the user presses an OK key in the control device when the selector 42 moves to the position of the item 413, so as to display detailed information of the content of the television assistant application in a full screen, and to allow the user to operate the application. For another example, the item 413 corresponds to a thumbnail of a picture, the thumbnail may be activated on the basis that the user presses the OK key in the control device when the selector 42 moves to the position of the item 413, so as to display the picture content in a full screen, and to allow the user to confirm whether the picture is set as a screen saver picture.

The plurality of items in the first GUI 41 may be arranged in a column, wherein the quantity of the columns is determined by a page width actually displayed by the screen. The items at the different columns in the first GUI 41 may cross in a height direction of the items. The items displayed in the first GUI 41 may be obtained by scaling the obtained to-be-displayed items.

In the following embodiments, pictures are taken as an example for illustration.

A user interface of a display apparatus may be configured to display pictures loaded in a page. Certainly, all the loaded pictures may be displayed, or part of the loaded pictures may be displayed, which may be specifically determined by a picture loading amount, and a size of the user interface.

The page may display the different pictures in a view display region of the user interface in a scrolling mode. All the pictures in the page are arranged in an equal-width and unequal-height mode.

In this way, the whole page is in a cascade layout, however, there is still a "column" concept in the page layout, and neatness of picture arrangement in the page is ensured to a certain extent. Meanwhile, there is no constraint of uniform specified size, an original picture does not need to be tailored, therefore, a problem that part of the picture is missed may be avoided, more sufficient, real and original picture information is displayed for a user, and the user may determine correctly according to the picture displayed in the user interface.

In a scenario, the view display region displays a home page of an application. Upon receiving a user input for indicating entering into a classification bar, a classification bar page may be entered. Correspondingly, the view display region will display a part of the classification bar page, including the plurality of pictures arranged in the equal-width and unequal-height mode. Upon receiving an instruction for indicating amplifying a picture in the classification bar page, the picture currently selected by a selector may be amplified to a full screen, so as to display a high-definition large picture.

Two modes for making the plurality of pictures in the view display region arranged in the equal-width and unequal-height mode are provided below.

First Arrangement Mode

Before loading the pictures into the page, resource data may be requested from a page server firstly, and the resource data includes the pictures. Because resources of the smart television are quite rich, a page server may provide hundreds or thousands of the resource data. However, the quantity of the resource data that the user each time can watch is limited, so there is no need to load all the resource data in the page server.

Therefore, requesting in batches may be performed when the resource data are requested from the page server. For example, 30 pieces (the request quantity each time is specifically determined as appropriate) of resource data are requested from the page server each time for displaying. When a new picture needs to be displayed, for example, when the user moves the selector to the bottom of the user interface by operating a control device, a next batch of resource data is requested.

The picture acquired by each request may be stored in a one-dimensional array originArray: [originItem0, originItem1, originItem2 . . . ], thus the picture has a certain sequence, and an array index of the picture is a serial number of the picture among all the pictures. Certainly, the specific storage modes are not limited and may be determined according to needs.

When the needed pictures are loaded into the page, a first picture may be obtained from the currently requested pictures. For example, a first picture with a minimum array index may be obtained from all the unloaded pictures stored in the one-dimensional array originArray. If all the pictures in the one-dimensional array originArray are not loaded, the first picture in the array may be obtained to serve as the first picture. If some of the pictures in the one-dimensional array originArray have been loaded, a picture behind the latest loaded picture in the array may be obtained to serve as the first picture.

The first picture obtained is scaled to obtain a second picture with a width being a set width. Because picture scaling is performed before each time of loading, the width of the pictures loaded to the page is the set width, thereby ensuring that the pictures in the page have the equal widths, and also ensuring that the pictures in the view display region have the equal widths.

The sizes of the pictures provided by the page server are generally uneven. If these pictures are directly loaded to the page, the page will become disorderly and unsystematic, affecting the watching experience of the user. If these pictures are tailored into the unified size and then loaded to the page, a portion of the pictures may be missed.

In order to ensure the user watching experience to a certain extent and avoid missing a portion of the picture, in the embodiment, a picture scaling mode is adopted to unify the width of the pictures loaded to the page, thus the pictures in the page may be arranged in several columns neatly, and meanwhile, a problem that a portion of the picture is missed may be avoided.

The first picture may be processed via equal scaling to avoid the problem of scene deformation in presented images. For example, the size of the first picture is 640×480, the set width is 120, then the first picture is zoomed into a picture with the size of 160×120 to obtain a second picture, wherein the width is reduced by four times, the height is also reduced by four times, and a height-width ratio of the second picture is the same as that of the first picture. Certainly, the scaling is not limited to equal scaling, and may also be unequal scaling only if it may be ensured that the width of the second picture required to be loaded is the set width.

After being obtained, the second picture needs to be loaded into the page, so that the second picture is displayed in the view display region. In the process of loading the picture into the page, a two-dimensional array is used for sequentially storing detailed information of the picture, which may include a URL of the picture, the width and height after scaling, and position information of the picture. A first dimension of the two-dimensional array represents the order of the columns of the page, a second dimension represents the detailed information of the picture loaded in each column, the name of the two-dimensional array is recorded as allData: [[item1, item2, item3 . . . ], [item1, item2, item3 . . . ], [item1, item2, item3 . . . ] . . . ], and related information may be obtained from the two-dimensional array when needed.

The position information of the picture may include: an X coordinate in a horizontal direction and a Y coordinate in a vertical direction in a coordinate system of the page application.

The coordinate system of the page application may take a vertex at a top left corner of the page as an origin, take the horizontal direction as an X direction, and take the vertical direction as a Y direction. In combination with FIGS. 3 and 4, the vertex at the top left corner of the page P100 is the origin of the coordinate system, the direction from the origin to the right on the upper boundary of the page 100 is a forward direction of an X axis, and the direction from the origin to the bottom on the left boundary of the page 100 is a forward direction of a Y axis. Certainly, the coordinate system of the page application is also not limited to this, and may be set according to needs.

When the second picture is loaded into the page, whether the quantity of the loaded pictures in the page reaches the total column quantity of all the columns in the page may be checked, if not, it means that the first row of the page is not fully loaded with the pictures, and if yes, it means that the first row of the page has been fully loaded with the pictures.

For example, the total column quantity is four, four columns may be placed in the page totally, then four pictures may be placed in the first row, however, if the page is not fully loaded with the pictures, or only loaded with one, two or three pictures, the first row is not fully loaded with the pictures.

If the first row of the page is not fully loaded with the pictures, the second picture is placed in the first row of the page. If the first row is not loaded with the pictures, a first column serves as a target column required to be loaded with the second picture; and if N1 quantity of pictures have been loaded in the first row, where N1 is greater than 0 and smaller than the total column quantity, an $(N1+1)^{th}$ column is determined as the target column required to be loaded with the second picture.

In this case, a distance between the target column and the left boundary of the page serves as an X coordinate of the second picture, and the set Y coordinate is determined as a Y coordinate of the second picture.

The distance between the target column and the left boundary of the page may also be preset, that is, the distances between all the columns and the left boundary of the page are set in advance, a corresponding relationship of the distances and the columns is set, and when the target column is determined, the distance corresponding to the target column is searched from the preset distance.

Or, the distance between the target column and the left boundary of the page may also be calculated. For example, referring to FIG. 4, when the target column is the third column, the distance is: a distance from I1 to the left boundary of the page+a width of I1+a width of I2+a set horizontal spacing×2, wherein the set horizontal spacing is a space between the two pictures, and is also a space between the two columns.

The set Y coordinate may be, for example, 0. Certainly, if some spacing need to be left between the picture and the upper boundary of the picture, the set Y coordinate may also be set to be the spacing.

After the X coordinate and the Y coordinate of the second picture are determined, the second picture may be loaded into the page, so that the vertex at the top left corner of the second picture is located at a position corresponding to the X coordinate and the Y coordinate in the page.

After the distance between the target column and the left boundary of the page serves as the X coordinate of the second picture, and the set Y coordinate is determined as the Y coordinate of the second picture, a sum of the set Y coordinate, the height of the second picture, and the set vertical spacing may further be calculated to obtain a first sum value; and the first sum value is recorded as a height value corresponding to the target column.

For example, referring to FIG. 4, it is assumed that N1 is 1 and the target column is the second column, the set Y coordinate+h2+verticalSpacing is recorded as the height value corresponding to the second column, h2 is a height of the picture I2, verticalSpacing is the set vertical spacing, in this way, when it is subsequently determined that the position information of the picture in the second column needs to be loaded, the Y coordinate of the picture, for example, the Y coordinate of the picture I5 in FIG. 4, may be directly determined according to the height value corresponding to the second column.

It should be understood that if the pictures in the vertical direction do not need the spacing, the set vertical spacing may be 0; and if there is no spacing between the picture and the upper boundary of the page, the set Y coordinate may also be 0.

If the first row of the page has been fully loaded with the pictures, the second picture is placed in a position not the first row in the page. In this case, a minimum height value may be determined from the recorded height values corresponding to all the columns, wherein the height value indicates a sum of the heights of all the loaded pictures in the corresponding columns, and the column corresponding to the minimum height value is determined as the target column required to be loaded with the second picture.

In order to balance a height difference between all the columns of the loaded pictures, when the first row of the page has been fully loaded with the pictures, the minimum height value is determined from the recorded height values corresponding to all the columns, that is, a column with a minimum height sum of all the loaded pictures is searched to serve as the target column, and the second picture is loaded to the target column, thereby reducing the height difference of the pictures loaded in the target column and the pictures loaded in other columns.

Figure 3:
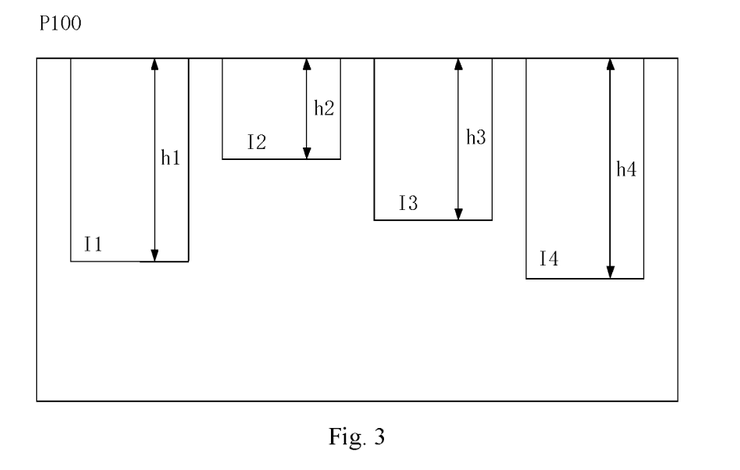
FIG. 3 illustrates a schematic effect diagram that a first row of a page is fully loaded with pictures.
Figure 4:
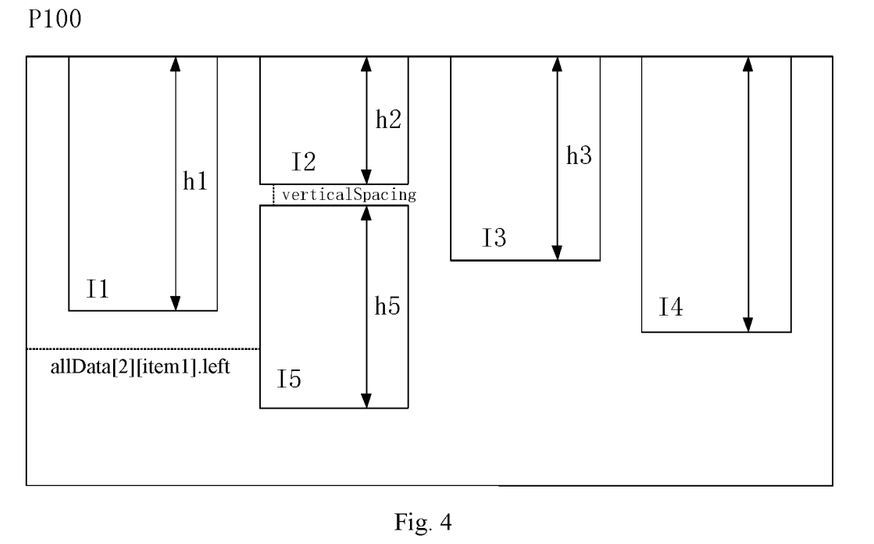
FIG. 4 illustrates a schematic effect diagram when another picture is loaded on the basis of FIG. 3.

Referring to FIG. 3 and FIG. 4, the page P100 totally has the four columns, the four columns respectively show the pictures I1-I4, therefore, the first row of the page 100 has been fully loaded with the pictures, in this case, the height values corresponding to the four columns are h1+verticalSpacing, h2+verticalSpacing, h3+verticalSpacing, and h4+vertical Spacing respectively, wherein, verticalSpacings are the same, and h2 is the minimum one among h1, h2, h3 and h4. Therefore, h2+verticalSpacing is minimum, and the second column corresponding to h2+vertical Spacing serves as the target column.

The height value indicates a height sum of the loaded pictures in the column. Specifically, the height value may be set Y coordinate+the height sum of the loaded pictures in the column+the quantity of the loaded pictures in the column× verticalSpacing, certainly, the set Y coordinate may be 0, and verticalSpacing may also be 0, which may be specifically set according to needs.

In some embodiments, after the column corresponding to the minimum height value is determined as the target column required to be loaded with the second picture, the X coordinate of any loaded picture in the target column is determined as the X coordinate of the second picture, and the minimum height value is determined as the Y coordinate of the second picture.

The X coordinates of all the loaded pictures in the same column are the same, and therefore, the X coordinate of any loaded picture in the target column may be determined as the X coordinate of the second picture. Certainly, the distance between the target column and the left boundary of the page may also be determined as the X coordinate of the second picture.

The minimum height value indicates a height sum of the loaded pictures in the target column, and may specifically be set Y coordinate+the height sum of the loaded pictures in the target column+the quantity of the loaded pictures in the target column x verticalSpacing, and therefore, the minimum height value may be determined as the Y coordinate of the second picture.

Referring to FIG. 4, the target column is the second column in the page P100, I5 is the second picture, allData [2][item1].left is the X coordinate of the picture I2, the picture I2 is in the second column, and therefore, allData [2][item1].left serves as the X coordinate of the second picture I5. The recorded height value corresponding to the second column is set Y coordinate+h2+verticalSpacing, and the height value may directly serve as the Y coordinate of the second picture I5.

After the X coordinate and the Y coordinate of the second picture are determined, the second picture may be loaded into the page, so that the vertex at the top left corner of the second picture is located in the position corresponding to the X coordinate and the Y coordinate in the page.

In some embodiments, after the minimum height value is determined as the Y coordinate of the second picture, the sum of the minimum height value, the height of the second picture and the set vertical spacing may be calculated to obtain a second sum value; and the recorded height value corresponding to the target column is modified as the second sum value.

For example, referring to FIG. 4, the second column is the target column, the picture I5 is the second picture, the recorded allData[2][item1].left is modified into allData[2] [item1].left+h5+vertical Spacing, wherein h5 is the height of the picture I5. In this way, when the position information of the pictures required to be loaded in the second column is subsequently determined, the Y coordinate of the picture may be directly determined according to the corresponding height value. Furthermore, the column to where the next picture required to be loaded may further be determined according to the height values corresponding to all the columns.

As for the first mode, a more specific example is provided, and the mode that a controller lays out the pictures in an equal-width and unequal-height arrangement mode includes the following steps.

A1) a first picture is obtained.

A2) the first picture is scaled so as to obtain a second picture with the width being the set width.

A3) whether the quantity of the loaded pictures in the page reaches the total column quantity of the page is checked, if no, it means that the first row of the page is not fully loaded with the pictures, and the flow goes to step A4, otherwise, it means that the first row of the page has been fully loaded with the pictures, and the flow goes to step A7.

A4) any column not loaded with the pictures may be determined as the target column.

A5) the distance between the target column and the left boundary of the page is determined as the X coordinate of the second picture, the set Y coordinate is determined as the Y coordinate of the second picture, and the sum of the set Y coordinate, the height of the second picture, and the set vertical spacing is recorded as the height value corresponding to the target column.

A6) the second picture is loaded to the position corresponding to the X coordinate and the Y coordinate of the second picture in the page, and is displayed when the second picture moves to a user interface of the display apparatus.

A7) the minimum height value is determined from the recorded height values corresponding to all the columns, and the column corresponding to the minimum height value is determined as the target column.

A8) a X coordinate of any loaded picture in the target column is determined as the X coordinate of the second picture, the height value corresponding to the target column is determined as the Y coordinate of the second picture, and the recorded height value corresponding to the target column is modified as the sum of the Y coordinate of the second picture, the height of the second picture and the set vertical spacing.

A9) the second picture is loaded to the position corresponding to the X coordinate and the Y coordinate of the second picture in the page, and is displayed when the second picture moves to the user interface of the display apparatus.

After the second picture is loaded into the page, the picture may be rendered, under control of the user, the page will move, for example, moving upwards, relative to the user interface, so that the loaded but not displayed picture will move into the user interface of the display apparatus for display.

Figure 5A:
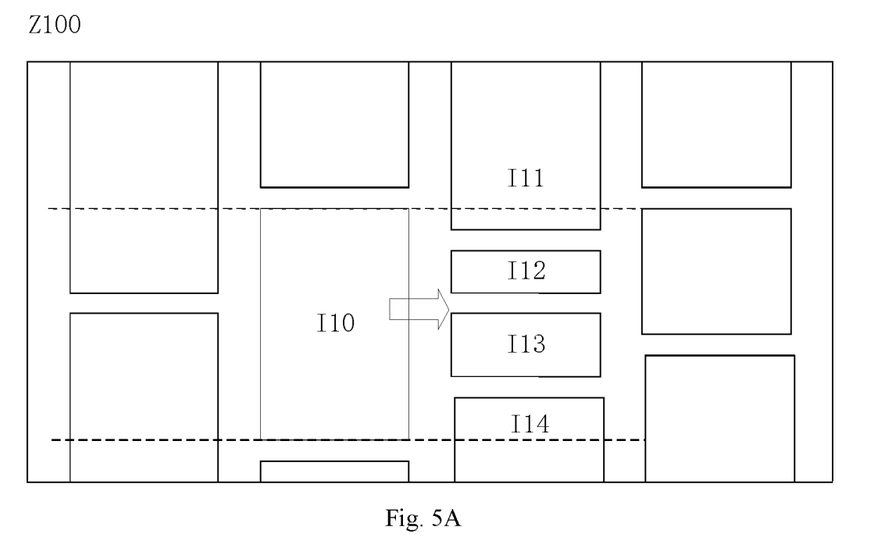
FIG. 5A and FIG. 5B illustrate schematic diagrams that a selector moves in a user interface to select different pictures.
Figure 5B:
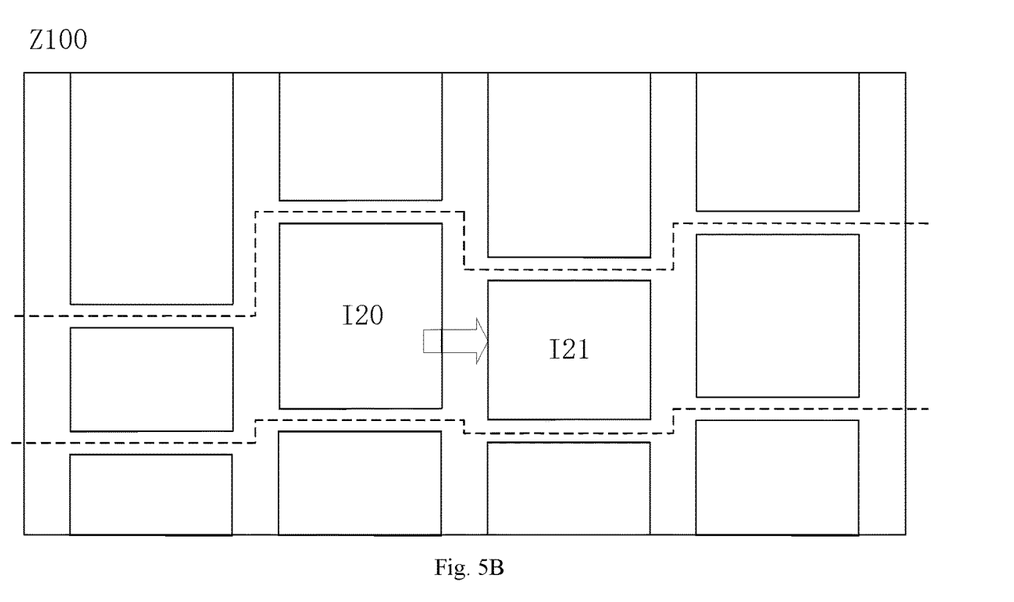

Because the user interface of the display apparatus is limited, the size of the page is larger than that of the user interface, the user interface may only display part of the loaded pictures in the page, and the pictures at the different positions need to be displayed through moving of the page. Referring to the user interface Z100 as shown in FIG. 5A and FIG. 5B, only part of the page is shown.

Generally speaking, the user interface will display the plurality of pictures, and the user operates a control device to move a selector in the user interface among the different pictures. When the selector moves to a certain picture, the user further clicks so as to further view the resources corresponding to the picture, for example, video data or high-definition pictures corresponding to the picture, and the like.

Second Layout Arrangement Mode

Resource data are requested from the page server, and the pictures are stored in a one-dimensional array originArray: [originItem0, originItem1, originItem2 . . . ]. The specific mode may refer to the described content in the first mode.

When the required pictures are loaded into the page, N2 first pictures may be obtained from the currently requested pictures, wherein N2 is the total column quantity of all the columns in the page. For example, N2 quantity of first pictures with a minimum array index may be obtained from all the unloaded pictures stored in the one-dimensional array originArray.

As for each first picture, the first picture is scaled to obtain a second picture with a width being the set width. The width of the pictures loaded to the page is unified as the set width, thereby ensuring that the pictures in the page have the equal widths, and also ensuring that the pictures in the view display region have the equal widths.

The sizes of the pictures provided by the page server are generally uneven. If these pictures are directly loaded to the page, the page will become disorderly and unsystematic, affecting the watching experience of the user. If these pictures are tailored into the unified size and then loaded to the page, a problem that a portion of the picture may miss will be caused.

In order to ensure the user watching experience and avoid missing a portion of the picture, in the embodiments, the picture scaling is adopted to unify the width of the pictures loaded to the page, thus the pictures in the page may be arranged in several columns neatly, and meanwhile, scene missing in a portion of the picture may be avoided.

After obtaining the N2 second pictures, the N2 second pictures need to be loaded into the page, so that the second pictures are displayed in the view display region. In the process of loading the picture into the page, a two-dimensional array is used for sequentially storing detailed information of the pictures, which may include a URL of the pictures, the width and height after scaling, and position information of the pictures. A first dimension of the two-dimensional array represents the order of the columns of the page, a second dimension represents the detailed information of the pictures loaded in each column, the name of the two-dimensional array is recorded as allData: [[item1, item2, item3 . . . ], [item1, item2, item3 . . . ], [item1, item2, item3 . . . ] . . . ], and related information may be obtained from the two-dimensional array when needed.

The position information of the pictures may include: an X coordinate in a horizontal direction and a Y coordinate in a vertical direction in a coordinate system of the page application.

The coordinate system of the page application may take a vertex at a top left corner of the page as an origin, take the horizontal direction as an X axis direction, and take the vertical direction as a Y axis direction. In combination with FIGS. 3 and 4, the vertex at the top left corner of the page P100 is the origin of the coordinate system, the direction from the origin to the right on the upper boundary of the page 100 is a forward direction of an X axis, and the direction from the origin to the bottom on the left boundary of the page 100 is a forward direction of a Y axis. Certainly, the coordinate system of the page application is also not limited to this, and may be set according to needs.

When the N2 second pictures are loaded into the page, whether the page is loaded with pictures may be checked (in this mode, the N2 second pictures are loaded each time, therefore, when the N2 second pictures are obtained, either the first row has been fully loaded with the pictures, or the first row is not loaded with the picture, whether the page is loaded with the picture only needs to be checked).

If the page is not loaded with the pictures, the N2 second pictures may be sequentially placed in the first row of the page.

If the page has been loaded with the pictures, all the columns in the page are sorted according the corresponding height values from low to high, the height value indicates the height sum of all the pictures in the corresponding column, the N2 second pictures are sorted according to height from high to low, and the sorted N2 second pictures are laid out into all the sorted columns in order.

The calculating the position information of the second picture and the height value corresponding to all the columns is similar to that in the first mode, which is not repeated here.

As for the second mode, a more specific example is provided, and the mode that the controller lays out the pictures in an equal-width and unequal-height mode includes the following steps.

B1) N2 first pictures are obtained.

B2) the N2 first pictures are scaled to obtain N2 second pictures with the width being the set width.

B3) whether the page is loaded with the pictures is checked, if no, the flow goes to step B4), otherwise, the flow goes to step B5.

B4) the N2 second pictures are placed in the first row of the page in order; and as for each second picture, the distance between a column where the second picture is located and the left boundary of the page is determined as the X coordinate of the second picture, the set Y coordinate is determined as the Y coordinate of the second picture, and the sum of the set Y coordinate, the height of the second picture, and the set vertical spacing is recorded as the height value corresponding to the column where the second picture is located.

B5) all the columns in the page are sorted according to the corresponding height value from low to high, the height value indicates the sum of heights of all the pictures in the corresponding column, the N2 second pictures are sorted according to height from high to low, and the sorted N2 second pictures are sequentially laid out into all the sorted columns; and as for each second picture, the X coordinate of any loaded picture in the column where the second picture is located is determined as the X coordinate of the second picture, the height value corresponding to the column where the second picture is located is determined as the Y coordinate of the second picture, and the recorded height value corresponding to the column where the second picture is located is modified as the sum of the Y coordinate of the second picture, the height of the second picture and the set vertical spacing.

After the N2 second pictures are loaded, the difference between the height values corresponding to all the columns will become smaller, and a certain column is prevented from being too low or too high, which allows for improving the visual effect.

For example, referring to FIG. 5B, in the user interface Z100, the height difference of the different pictures in the first row is large, resulting in a zigzag segment line between the first row and a second row. After adopting the above mode, a segment line between the second row and a third row is obviously much gentle, and a dislocation degree is reduced to a great extent.

Based on the above first layout arrangement mode or second layout arrangement mode, after all the second pictures are loaded into the page, the pictures may be continuously obtained from the one-dimensional array originArray to be loaded until the pictures currently stored in the one-dimensional array originArray are all loaded.

It can be known from the above that the page layout mode is in a cascade form. Especially the page obtained in the first layout mode for example, the concept of "row" in traditional layout is omitted, the items in different columns in the view display region cross in a height direction of the items, and management of the selector relatively becomes complex.

As for the display apparatus, the basic function is to make the control device to switch the selector, and effectiveness and correctness of selector switching must be ensured. Therefore, a selector management mode is further provided to give a mode for moving a selector under the cascade layout.

In order to realize the selector management, the controller is further configured to: control the selector to move from a first item where the selector is currently located to a second item in response to user input for indicating moving the selector, wherein regions of the second item and the first item have a maximum consistence along a height direction of the column.

In combination with the contents in the above embodiments, the selector management mode is illustrated below, wherein pictures are taken as an example of the item.

Upon receiving an user input (hereinafter referred to as first user input) for indicating moving the selector, a third picture where the selector is currently located is determined from the page according to the first user input, and a column (column A for short) to which the selector needs to move is determined.

The first user input may be triggered by the control device, the first user input may carry an identifier or position information of the third picture where the selector is currently located, and the third picture may be determined according to the identifier or the position information. Certainly, the specific determination manner of the third picture is not limited, for example, the position information of the picture where the selector is located may further be saved each time after the selector moves, in this way, when the first user input is received, the third picture may be determined according to the saved position information.

The first user input may indicate a move direction, and whether the selector moves up and down or needs to move horizontally in the column where the third picture is located may be determined according to the move direction.

In a scenario where the move is horizontal, the column where the third picture is located is different from the column A, and the column A is determined through the following ways, including the following.

If the move direction is a direction towards a left side of the third picture, the column A is a previous column of the column where the third picture is located.

If the move direction is a direction towards a right side of the third picture, the column A is a next column of the column where the third picture is located.

If the column where the third picture is located is different from the column A, the pictures meeting the following conditions are searched in the column A: a Y coordinate of the picture or a sum of the Y coordinate of the picture and a height of the picture is greater than a Y coordinate of the third picture, but is not greater than a sum of the Y coordinate of the third picture and a height of the third picture.

The pictures meeting the above conditions may be searched in the column A by traversing. The traversing may be in an order from top to bottom, and traversing is not specifically limited herein. For example, binary search may further be adopted for traversing. The pictures are varied in height, from the height perspective, the pictures in any column are ordered by sorting according to the height, and initial pictures with height consistence may be quickly positioned by searching via binary search.

According to the above condition, the picture searched at least has partial consistence with the third picture in the height direction (the consistence does not mean that the pictures are overlap or overlay, but refers to that part of the two pictures may be same in height).

For example, referring to FIG. 5A, in the user interface Z100, the selector is currently located on a picture I10. When a first user input is received, the picture I10 is determined as the third picture, the picture I10 is located in the second column, the move direction indicated by the first user input is a direction towards the right side of the third picture, and then it is determined that the column A is the third column. The four pictures I11-I14 are searched through traverse, the four pictures have consistence in the height direction, and the consistence part may be seen through two dotted lines shown in FIG. 5A.

After all the pictures meeting the conditions are being searched, a fourth picture may be selected from all the searched pictures according to a preset selection strategy, and the selector is moved to the fourth picture.

For example, if the quantity of the picture searched is 1, the picture may be directly determined as the fourth picture; and if a plurality of pictures are found, the picture with the maximum consistence part with the third picture in height may be determined among all the pictures searched to serve as the fourth picture.

The consistence height of each picture with the third picture may be calculated firstly according to the Y coordinate of the picture searched, the height of the picture searched, the Y coordinate of the third picture, and the height of the third picture, and then the picture with the maximum consistence height is determined therefrom to serve as the fourth picture.

Certainly, the above preset selection strategy is only an example, there may be other selection manners, for example, the picture with the minimum Y coordinate may be selected from all the pictures searched to serve as the fourth picture.

In the embodiments, the selector management manner has a high adaptability, and may meet display of the pictures with the various sizes, and is especially suitable for the first layout mode.

On the basis of the above second layout mode, if a height difference of any two second pictures in the N2 second pictures is smaller than a set height, that is, the height of the N2 second pictures each time has a little difference, the page layout still has the concept of "row", and in this case, another simpler selector management manner may further be adopted.

In combination with the contents in the above second layout mode, another selector management manner is illustrated below, wherein a picture is taken as an example of the item.

When the first user input is received, a third picture where the selector is currently located is determined from the page according to the first user input, and the column A to which the selector needs to move is determined. The approach for determining the third picture and the column A is similar to that in the above embodiments, which will not be repeated here.

If the column where the third picture is located is different from the column A, a fifth picture located on the same row as the third picture is determined from the column A, and the selector is moved to the fifth picture. The management of the selector is not complex, small in calculation amount, and easy to realize.

For example, referring to FIG. 5B, rows of pictures may be obviously seen from the user interface Z100, and the selector is currently located on a picture I20. When the first user input is received, the picture I20 is determined as the third picture, the picture I20 is located in the second column, a move direction indicated by the first user input is a direction towards the right side of the third picture, and then the second column is determined as the third column. The picture I21 in the third column and the picture I20 in the second column are located in the same row, therefore, the picture I21 is the fifth picture, and the selector is moved to the picture I21.

Certainly, if the move direction is towards the upper portion of the third picture, the selector is moved to the picture located above the third picture in the column where the third picture is located. If the move direction is towards the lower portion of the third picture, the selector is moved to the picture located below the third picture in the column where the third picture is located.

In an embodiment, the controller is further configured to: when it is determined that the selector tries to move from the interior of the user interface to a region outside the user interface, update a current user interface to get an updated user interface comprising an item outside the current user interface and control the selector to select the item in the updated user interface.

In some embodiments, when determining that the selector tries to move from the user interface to a region outside the user interface, the controller is configured to: determine that the selector tries to move from the interior of the user interface to a region outside the user interface if it is determined that the selector is currently located on an item at a boundary in the user interface based on a user input for indicating moving the selector and the user input indicates that the selector will select the item outside the boundary of the user interface.

Illustration is made by taking a picture as an example of the item. In other words, when the selector moves to the picture at the boundary of the user interface and tries to move in the direction to the outside of the user interface, the next batch of resource data is requested from the page server. For example, referring to FIG. 5B, when the selector moves to the picture below I20 and tries to continuously move downwards, the next batch of resource data is requested from the page server.

The user interface of the display apparatus is limited in size, and therefore there is no need to load all the requested pictures in the page. It is assumed that offset of the current page relative to the display apparatus is offsetHeight (the offset is a negative value, and the upper the page moves, the smaller the offset is), the height of the user interface is pageHeight, and thus only the picture meeting the following condition needs to be displayed: allData[i][j].top+allData[i][j].height+offsetHeight>0 && allData[i][j].top+offsetHeight<pageHeight, where allData[i][j].top is the Y coordinate of the picture, and allData[i][j].height is the height of the picture.

Only the picture meeting the above condition will be in the user interface, and thus may be displayed in the user interface. The page may only load the picture meeting the condition. In order to avoid the problem of slow response due to excessively-long time consumption of picture loading when the selector moves to the top and then continues to move upwards, or moves to the bottom and then continues to move downwards, some pictures may also be loaded above or below the user interface in the page firstly.

Obviously, those skilled in the art can make various modifications and variations to the disclosure without departing from the spirit and scope of the disclosure. These modifications and variations of the disclosure fall within the scope of the claims of the disclosure.

What is claimed is:

1. A display apparatus, comprising:
   a display;
   a user input interface, configured to receive a user input; and
   a controller, configured to:
   control the display to present a user interface in response to a first user input for indicating displaying of a plurality of items, wherein
   the user interface comprises the plurality of items, and the plurality of items are arranged in columns and are configured with equal widths and unequal heights; and
   the user interface comprises a selector for indicating that an item is selected, and different items may be selected by moving the selector in the user interface;
   control the selector to move from a current item to a target item in response to a second user input for indicating moving the selector, wherein regions of the target item and the current item have a maximum consistence along a height direction of the column; and
   in response to a sixth user input for displaying a type of items, wherein the type of items comprises a plurality of items, and the plurality of items comprise at least one target item;
   sort a preset quantity of columns according to heights of items in the present quantity of columns from low to high, sort a preset quantity of target items obtained according to heights of the target items from high to low, arrange the preset quantity of target items sorted to the preset quantity of columns sorted in order, and control the display to present a user interface comprising the type of items.

2. The display apparatus according to claim 1, wherein a quantity of the columns is determined by a page width shown by the display of the display apparatus.

3. The display apparatus according to claim 1, wherein the controller is further configured to:
in response to a third user input for indicating activation of a selected item, activate the selected item.

4. The display apparatus according to claim 1, wherein the controller is configured to:
in response to the selector moving from the user interface currently presented on the display to a region outside the user interface, cause a first item in the region outside the user interface and not yet displayed in the user interface to present in an updated user interface and cause the selector to move onto the first item in the updated user interface.

5. The display apparatus according to claim 4, wherein the controller is further configured to:
while the selector is currently located on an item at a boundary of the user interface, receive a fourth user input for indicating moving the selector to select an item outside the boundary of the user interface, and determine that the selector is moving from the user interface currently presented on the display to a region outside the user interface.

6. The display apparatus according to claim 1, wherein the controller is further configured to:
in response to a fifth user input for displaying a type of items, wherein the type of items comprises a plurality of items including at least one target item:
determine heights of items in one or more columns, arrange one of the at least one target item obtained to a column with a minimum height among the one or more column, and control the display to display a user interface comprising the type of items.

7. The display apparatus according to claim 6, wherein the plurality of items in the user interface are arranged in columns and not arranged in rows.

8. The display apparatus according to claim 6, wherein the items in the different columns in the user interface cross along a height direction of the items.

9. The display apparatus according to claim 1, wherein the type of items displayed in the user interface are obtained by scaling the target items.

10. A user interface display method, comprising:
presenting a user interface on a display of a display apparatus in response to a first user input for indicating displaying of a plurality of items, wherein the user interface of the display apparatus comprises the plurality of items, and the plurality of items are arranged in columns and are configured with equal widths and unequal heights; and the user interface comprises a selector for indicating that an item is selected, and different items may be selected by moving the selector in the user interface;
controlling the selector to move from a current item to a target item in response to a second user input for indicating moving the selector, wherein regions of the target item and the current item have a maximum consistence along a height direction of the column, and
in response to a sixth user input for displaying a type of items, wherein the type of items comprises a plurality of items, and the plurality of items comprise at least one target item;
sorting a preset quantity of columns according to height of items in the present quantity of columns from low to high, sorting a preset quantity of target items obtained according to heights of the target items from high to low, arranging the preset quantity of target items sorted to the preset quantity of columns sorted in order, and controlling the display to present a user interface comprising the type of items.

11. The method according to claim 10, wherein a quantity of the columns is determined by a page width shown by the display of the display apparatus.

12. The method according to claim 10, further comprising:
in response to a third user input for indicating activation of a selected item, activating the selected item.

13. The method according to claim 10, further comprising:
in response to the selector moving from the user interface currently presented on the display to a region outside the user interface, causing a first item in the region outside the user interface and not yet displayed in the user interface to present in an updated user interface and causing the selector to move onto the first item in the updated user interface.

14. The method according to claim 13, further comprising:
while the selector is currently located on an item at a boundary of the user interface, receiving a fourth user input for indicating moving the selector to select an item outside the boundary of the user interface, and determining that the selector is moving from the user interface currently presented on the display to a region outside the user interface.

15. The method according to claim 10, further comprising:
in response to a fifth user input for displaying a type of items, wherein the type of items comprises a plurality of items including at least one target item: determining heights of items in one or more columns, arranging one of the at least one target item obtained to a column with a minimum height among the one or more column, and controlling the display to display a user interface comprising the type of items.

16. The method according to claim 15, wherein the plurality of items in the user interface are arranged in columns and not arranged in rows.

17. The method according to claim 15, wherein the items in the different columns in the user interface cross along a height direction of the items.

18. The method according to claim 10, wherein the type of items displayed in the user interface are obtained by scaling the target items.

* * * * *